(12) United States Patent
Yang

(10) Patent No.: US 9,636,879 B2
(45) Date of Patent: May 2, 2017

(54) METHOD FOR FORMING A PLASTIC SUPPORT SHELL OF A SOLE

(71) Applicant: Teng-Jen Yang, Taichung (TW)

(72) Inventor: Teng-Jen Yang, Taichung (TW)

( * ) Notice: Subject to any disclaimer, the term of this patent is extended or adjusted under 35 U.S.C. 154(b) by 126 days.

(21) Appl. No.: 14/742,318

(22) Filed: Jun. 17, 2015

(65) Prior Publication Data

US 2016/0368183 A1    Dec. 22, 2016

(51) Int. Cl.
| | |
|---|---|
| *B29C 43/02* | (2006.01) |
| *B29D 35/12* | (2010.01) |
| *B29C 51/10* | (2006.01) |
| *B29L 31/50* | (2006.01) |

(52) U.S. Cl.
CPC ............ *B29D 35/122* (2013.01); *B29C 51/10* (2013.01); *B29C 2793/009* (2013.01); *B29C 2793/0018* (2013.01); *B29C 2793/0027* (2013.01); *B29L 2031/504* (2013.01)

(58) Field of Classification Search
None
See application file for complete search history.

(56) References Cited

U.S. PATENT DOCUMENTS 5,993,585 A * 11/1999 Goodwin ............... A43B 7/144
 156/145
8,685,300 B2 * 4/2014 Bosch .................... A01G 9/021
 264/154

* cited by examiner

*Primary Examiner* — Monica Huson
(74) *Attorney, Agent, or Firm* — Wang Law Firm, Inc.

(57) ABSTRACT

A method for forming a plastic support shell of a sole includes the steps of placing a sheet material into a first mold assembly; softening the sheet material; vacuum plastic molding; putting the plastic semi product into a cutting mold assembly; cutting the waste edge; putting into a trimming mold assembly; and trimming with a mechanical arm. The carrying mold and the pressing mold press against the inner and outer surfaces of the plastic semi product, and the restricting edge and the support edge are used to define a cutting line. Therefore, the plastic semi product can be firmly positioned and held tight, and then the mechanical arm can trim the plastic semi product under the guiding of the restricting edge and the support edge, which makes the trimming process easy and precise.

3 Claims, 13 Drawing Sheets

METHOD FOR FORMING A PLASTIC SUPPORT SHELL OF A SOLE

BACKGROUND OF THE INVENTION

Field of the Invention

The present invention relates to a method for forming a sole, and more particularly to a method for forming a plastic support shell of a sole.

Description of the Prior Art

Foamed plastic can find wide application in the production of commodities of daily use, in transportation, industrial manufacturing and even in aero mechanical industry.

The manufacturing process varies depending on what purpose the foamed plastic is used for. For example, when it is used as an insole of a shoe, the foamed plastic must be formed to fit the shape of the sole, and the conventional method for forming this kind of foamed plastic not only involves the step of forming a semi product in the form of a thin shell by vacuum plastic molding, but also involves the steps of taking out the semi product, cutting, trimming and drilling. Since the semi product is a thin shell, it will be difficult to fix the thin shell semi product during the cutting, trimming and drilling process, which will result in low manufacturing accuracy and efficiency.

The present invention has arisen to mitigate and/or obviate the afore-described disadvantages.

SUMMARY OF THE INVENTION

The primary objective of the present invention is to provide a method for forming a plastic support shell of a sole which is capable of overcoming the low manufacturing accuracy and efficiency of the conventional method.

To achieve the above objective, a method for forming a plastic support shell of a sole in accordance with the present invention comprises the following steps:

placing a sheet material into a first mold assembly;

softening the sheet material by heating;

closing and vacuuming the first mold assembly, and cooling the sheet material down to obtain a plastic semi product which is shaped in the contour of the mold insert, the plastic semi product is a shell which has a protruding main portion and a plurality of hole alignment portions formed on an outer surface and a chamber formed on an inner surface, each of the hole alignment portions including a cutting edge which has a cutting angle less than 45 degrees, and the plastic semi product including a waste edge;

putting the plastic semi product into a cutting mold assembly which includes a stationary mold and a movable cutting mold, the stationary mold including a cutting insert which is formed in the shape of the chamber of the plastic semi product, to allow the plastic semi product to fully fit onto the cutting insert, the movable cutting mold including a cutting cavity which has a dimension larger than a dimension of the cutting insert;

moving the movable cutting mold toward the stationary mold, the edge of the cutting cavity is only able to come into contact with the cutting edge of the plastic semi product, so that when the movable cutting mold is pressed against the stationary mold to clamp the waste edge of the plastic semi product, the edge of the cutting cavity will cut the plastic semi product by cutting along the cutting edge, and the movable cutting mold will cut off the waste edge, as a result, the waste edge is cut off, and the cutting edge is also cut off to form holes;

putting the plastic semi product which has been treated by the previous step into a trimming mold assembly which includes a carrying mold and a pressing mold, the carrying mold including a carrying cavity which is formed in the shape of the plastic semi product so as to allow the plastic semi product to fully fit in the carrying cavity, the carrying mold further including a restricting wall which is located adjacent to the carrying cavity, the restricting wall including a restricting edge and is smaller in area than the plastic semi product, so that the peripheral edge of the plastic semi product will protrude out of the restricting wall after the plastic semi product is placed in the carrying cavity, the pressing mold including a support portion with a support edge and to be placed into the inner surface of the plastic semi product in a manner that the support edge is aligned to the restricting edge of the carrying mold, and the plastic semi product is clamped between the carrying mold and the pressing mold; and using a mechanical arm to trim the plastic semi product obtained from the previous steps by trimming along the support edge and the restricting edge, and obtaining a final product of the plastic support shell of a sole.

It is to be noted that the hole alignment portions of the mold insert allows the plastic semi product to be formed with the cutting edge, the cutting insert is formed in the shape of the chamber of the plastic semi product, and the edge of the cutting cavity is only able to come into contact with the cutting edge of the plastic semi product. With all these arrangements, holes can be directly formed and the waste edge can be directly cut off when the cutting mold assembly is closed, which makes the manufacturing process very easy. Furthermore, the plastic semi product is a thin shell structure, so that the follow-up steps cannot be performed if the plastic semi product is not held tight. The present invention uses the carrying mold and the pressing mold to press against the inner and outer surfaces of the plastic semi product, and uses the restricting edge and the support edge to define the cutting line. Therefore, the plastic semi product can be firmly positioned and held tight, and then the mechanical arm can trim the plastic semi product under the guiding of the restricting edge and the support edge, which makes the trimming process easy and precise.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
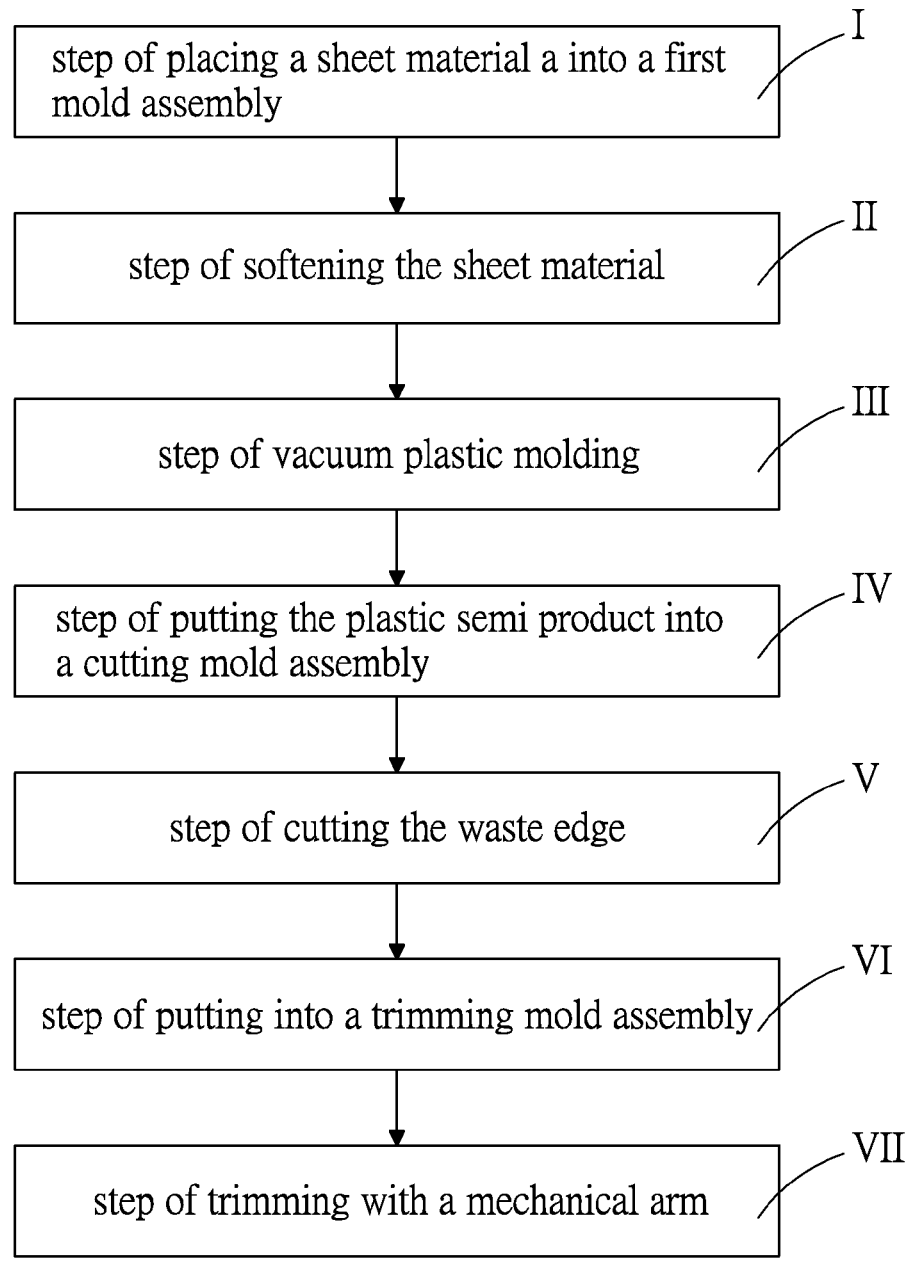
FIG. 1 is a flow chart of a method for forming a plastic support shell of a sole in accordance with the present invention.
Figure 2:
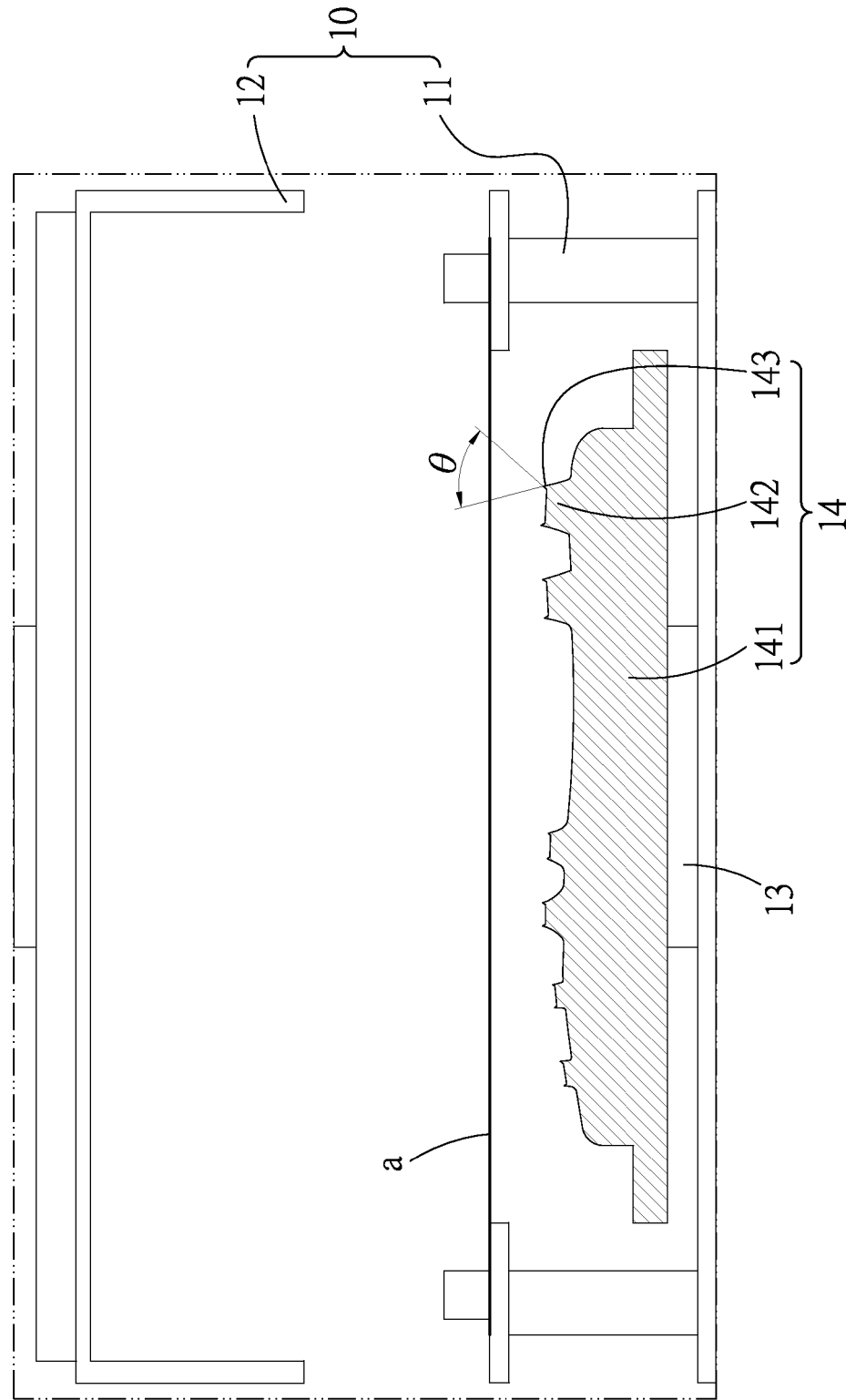
FIG. 2 is an illustrative view showing the step of softening the sheet material.

Referring to FIGS. 1-13, a method for forming a plastic support shell of a sole in accordance with present invention comprises the following steps:

A step I of placing a sheet material a into a first mold assembly 10, the first mold assembly 10 includes a first mold 11 and an opposite second mold 12. The first mold 11 includes an extendable and retractable seat 13 which is movable with respect to the second mold 12. On the extendable and retractable seat 13 is provided a mold insert 14 which includes a molding portion 141 and a plurality of hole alignment portions 142 formed on the molding portion 141. Each of the hole alignment portions 142 includes a cutting edge 143 which has a cutting angle θ less than 45 degrees. The sheet material a is placed on the first mold 11 of the first mold assembly 10 and located between the mold insert 14 of the first mold 11 and the second mold 12, as shown in FIG. 2.

Figure 3:
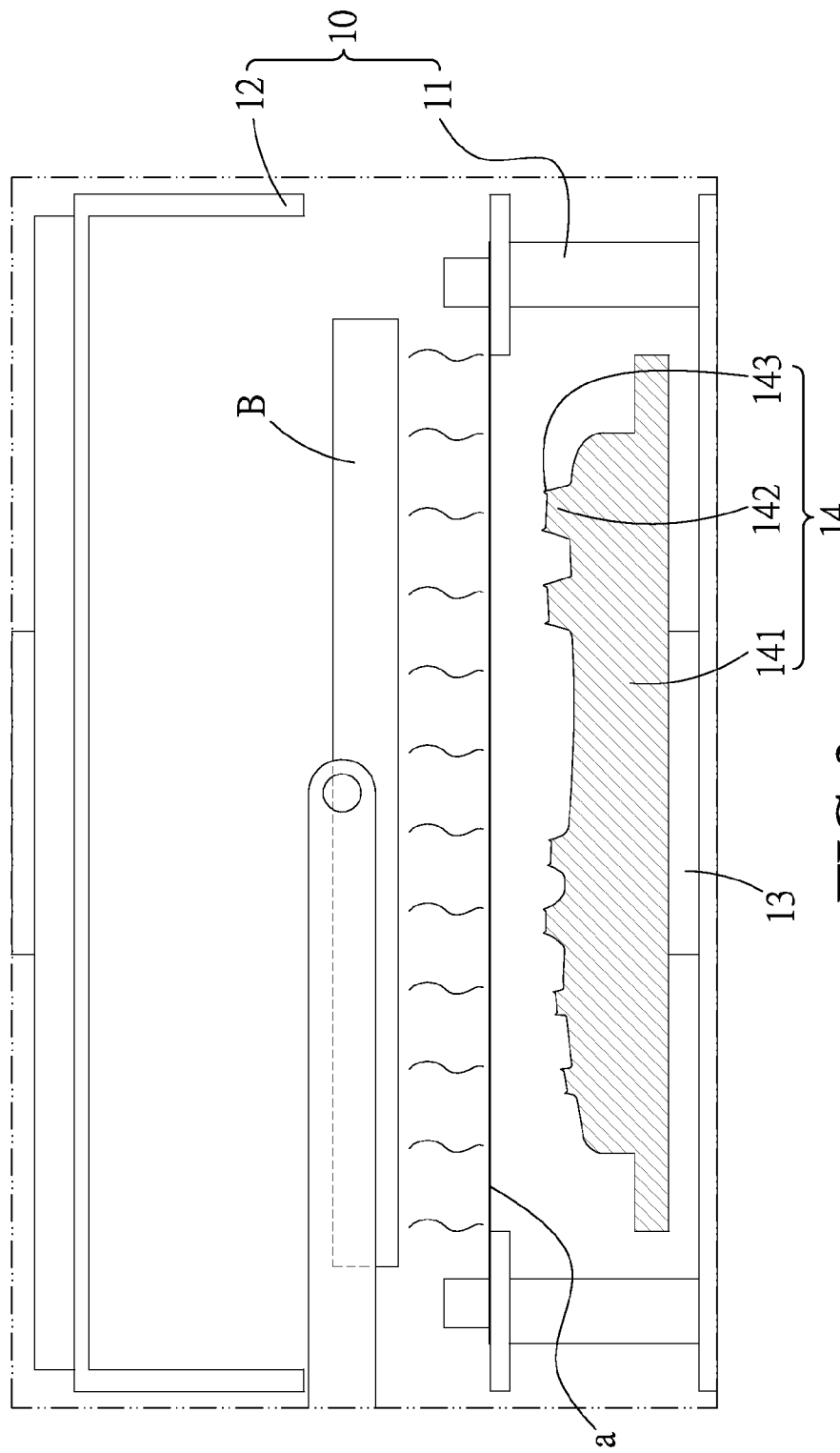
FIG. 3 is an illustrative view showing the step of softening the sheet material.

A step II of softening the sheet material a by providing a heating device B between the first and second molds 11, 12 to heat the sheet material a, as shown in FIG. 3.

Figure 4:
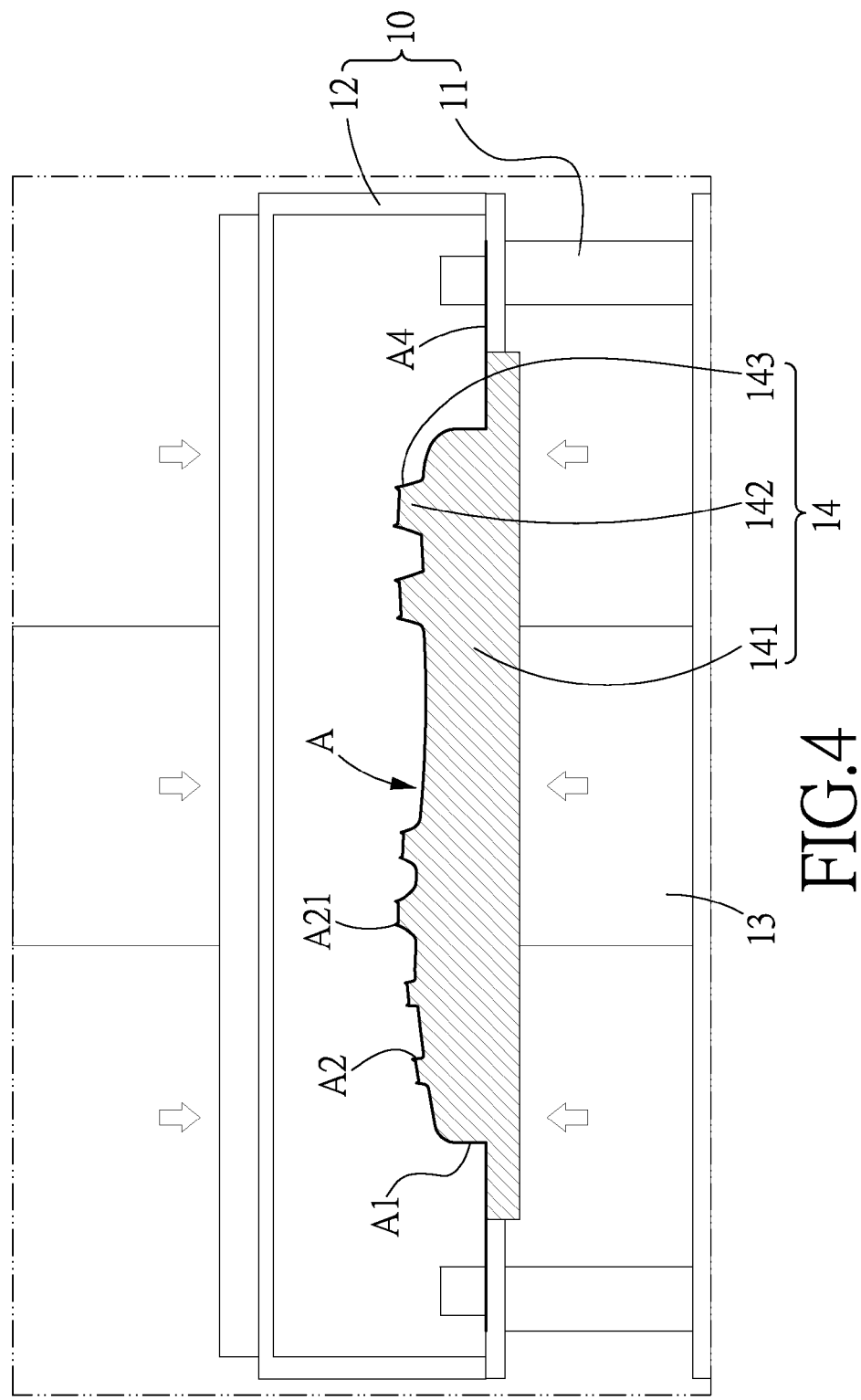
FIG. 4 is an illustrative view showing the step of vacuum plastic molding.
Figure 5:
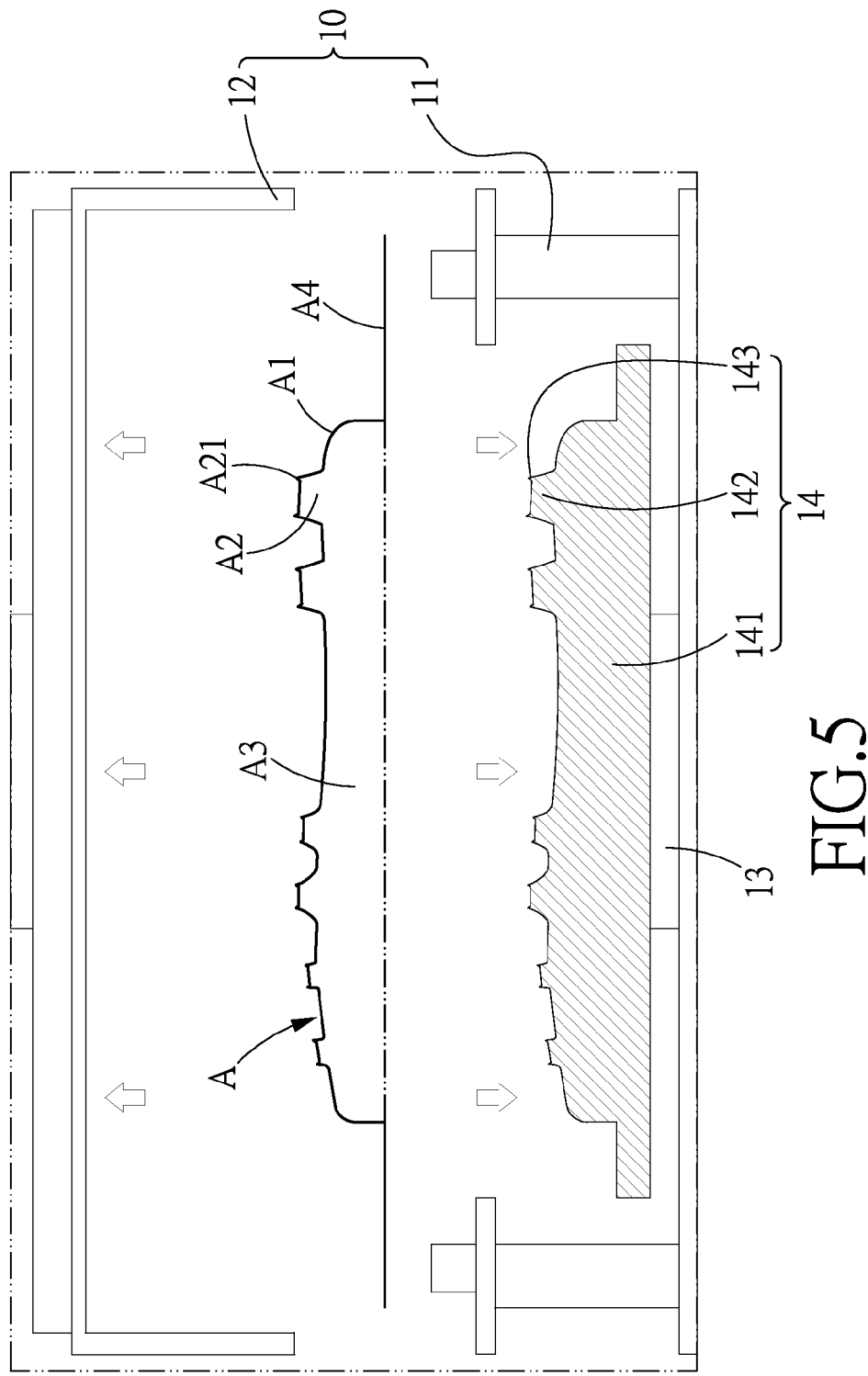
FIG. 5 is an illustrative view showing that the step of vacuum plastic molding is finished.

A step III of vacuum plastic molding: closing the first mold assembly 10 and vacuuming the space between the first and second molds 11, 12, moving the extendable and retractable seat 13 towards the second mold 12 until the mold insert 14 is pressed against the sheet material a, so that the sheet material a is pressed onto the mold insert 14 and shaped in the contour of the mold insert 14, as shown in FIG. 4. Then, moving the second mold 12 away from the first mold 11, and cooling the sheet material a down to obtain a plastic semi product A which is shaped in the contour of the mold insert 14. The plastic semi product A is a shell which has a protruding main portion A1 and a plurality of hole alignment portions A2 formed on an outer surface and a chamber A3 formed on an inner surface. Each of the hole alignment portions A2 includes a cutting edge A21 which has a cutting angle θ less than 45 degrees. The sheet material a is usually larger than the mold insert 14, therefore, the plastic semi product A formed by vacuum molding of the sheet material a will have a peripheral edge that does not come into contact with the molding portion 141 and the plurality of hole alignment portions 142, and this peripheral edge is defined as waste edge A4, as shown FIG. 5.

Figure 6:
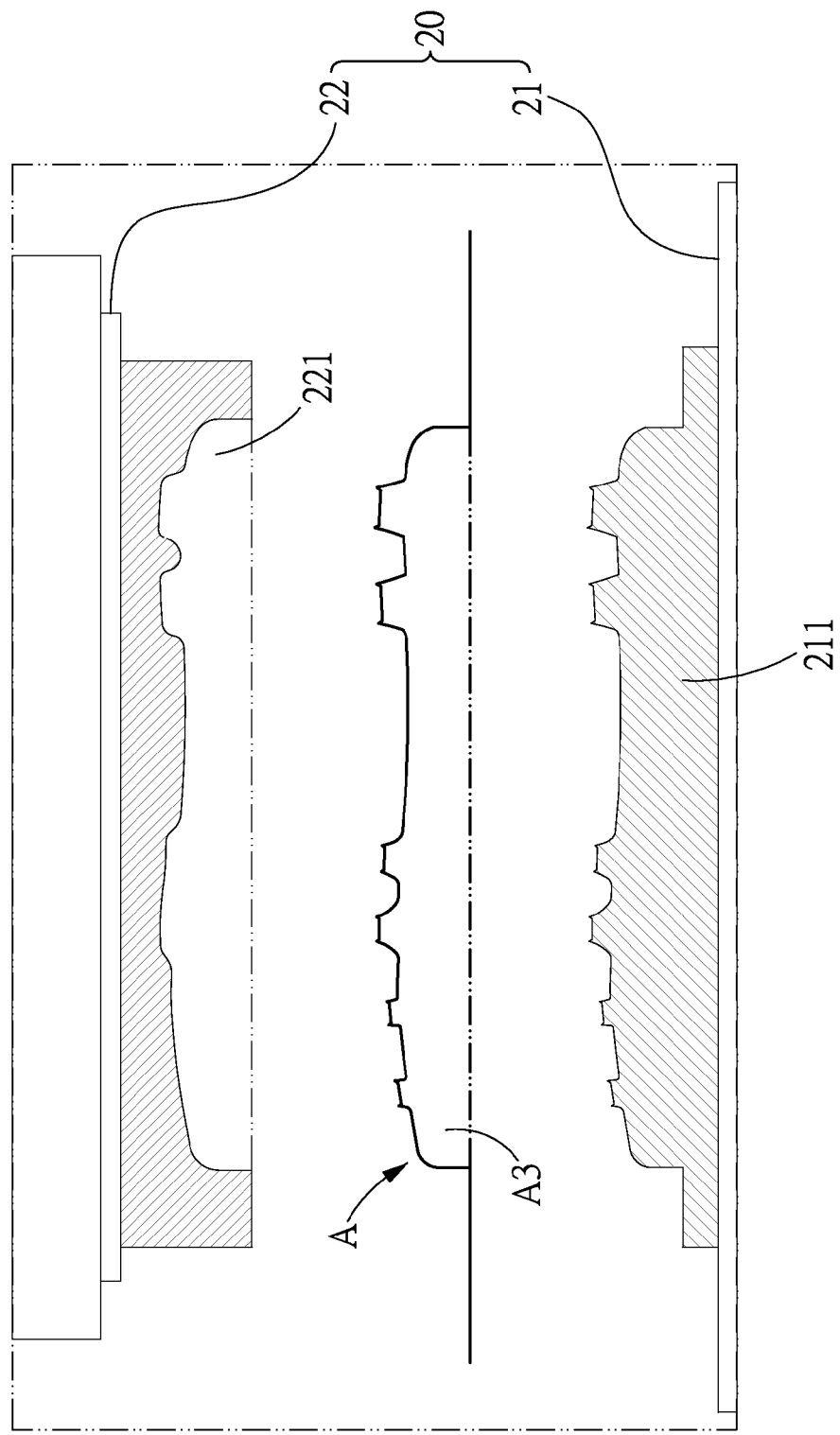
FIG. 6 is an illustrative view showing the step of putting the plastic semi product A into a cutting mold assembly.
Figure 7:
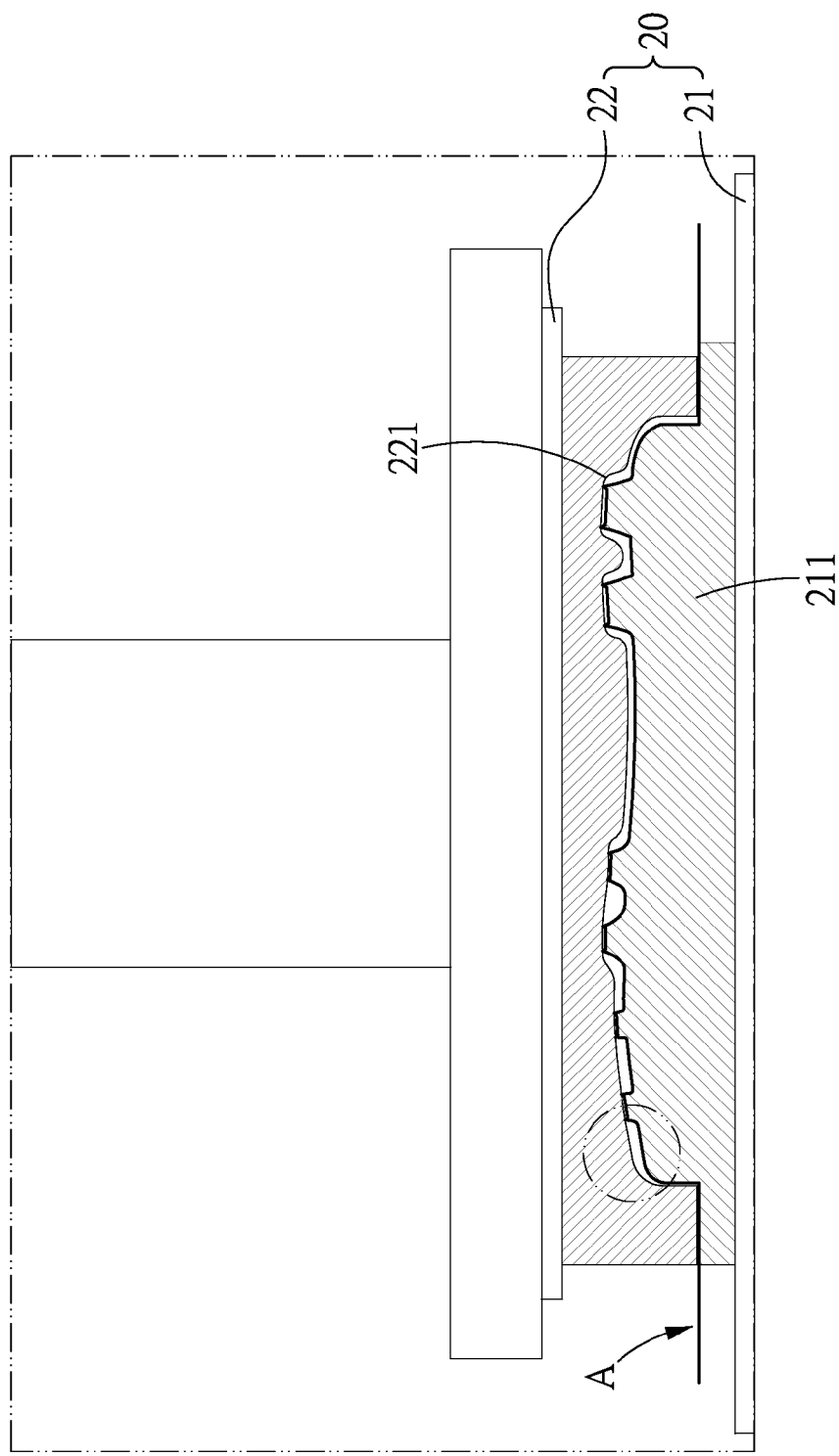
FIG. 7 is an illustrative view of the step of cutting the waste edge.
Figure 8:
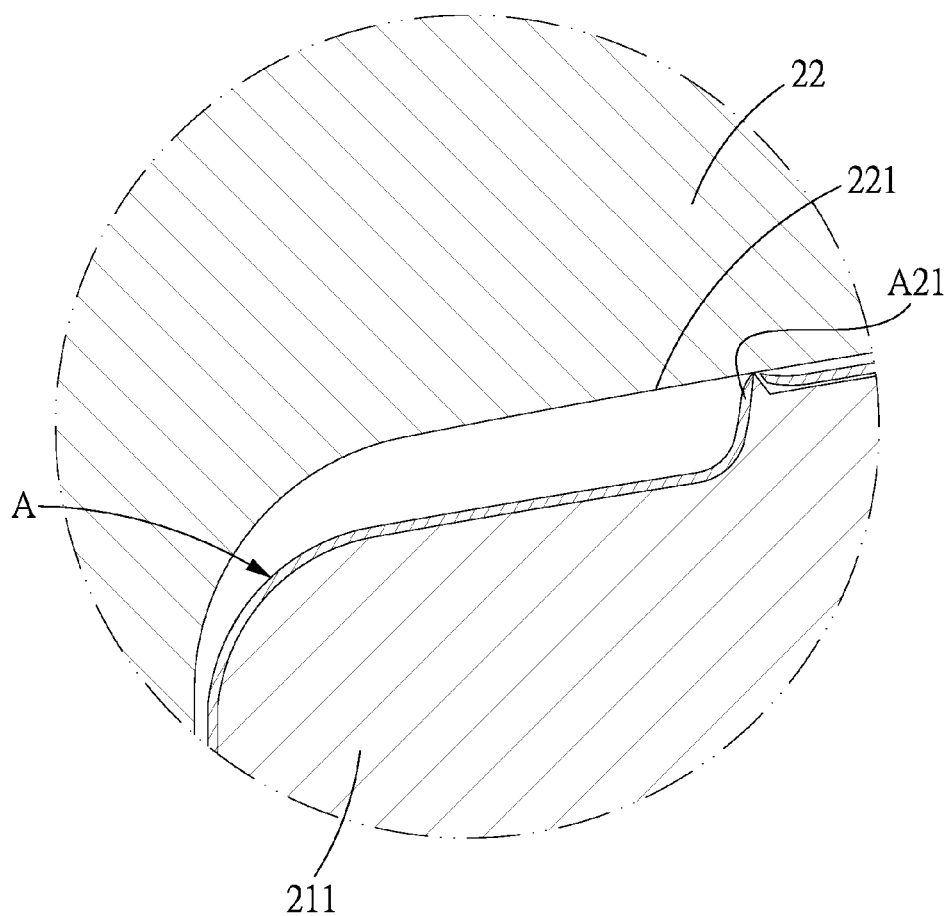
FIG. 8 is a magnified view of FIG. 7.

A step IV of putting the plastic semi product A into a cutting mold assembly 20 which includes a stationary mold 21 and a movable cutting mold 22. The stationary mold 21 includes a cutting insert 211 which is formed in the shape of the chamber A3 of the plastic semi product A, so that the plastic semi product A can fully fit onto the cutting insert 211. The movable cutting mold 22 includes a cutting cavity 221 which has a dimension larger than the dimension of the cutting insert 211, as shown in FIGS. 6-8.

Figure 9:
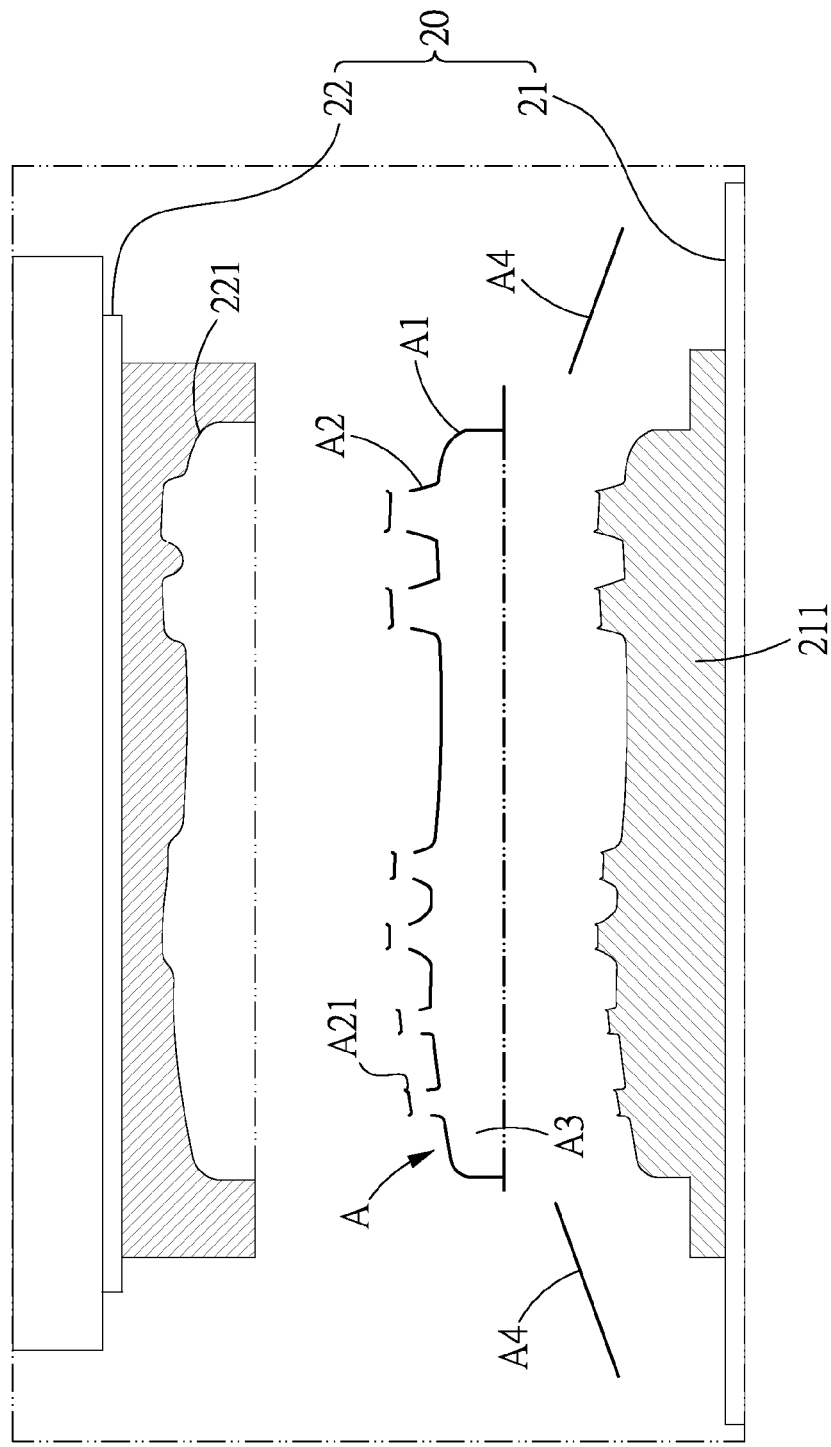
FIG. 9 is an illustrative view is an illustrative view that the step of cutting the waste edge has been finished.

A step V of cutting the waste edge: moving the movable cutting mold 22 toward the stationary mold 21, the edge of the cutting cavity 221 is only able to come into contact with the cutting edge A21 of the plastic semi product A, so that when the movable cutting mold 22 is pressed against the stationary mold 21 to clamp the waste edge A4 of the plastic semi product A, the edge of the cutting cavity 221 will cut the plastic semi product A by cutting along the cutting edge A21, and the movable cutting mold 22 will cut off the waste edge A4, as a result, the waste edge A4 is cut off, and the cutting edge A21 is also cut off to form holes, as shown FIG. 9.

A step VI of putting into a trimming mold assembly: putting the plastic semi product A which has been treated by the previous step into a trimming mold assembly 30 which includes a carrying mold 31 and a pressing mold 32. The carrying mold 31 includes a carrying cavity 311 which is formed in the shape of the plastic semi product A, so that the plastic semi product A can fully fit in the carrying cavity 311. The carrying mold 31 further includes a restricting wall 312 which is located adjacent to the carrying cavity 311. The restricting wall 312 includes a restricting edge 313 and is smaller in area than the plastic semi product A, so that the peripheral edge of the plastic semi product A will protrude out of the restricting wall 312 after the plastic semi product A is placed in the carrying cavity 311.

Figure 10:
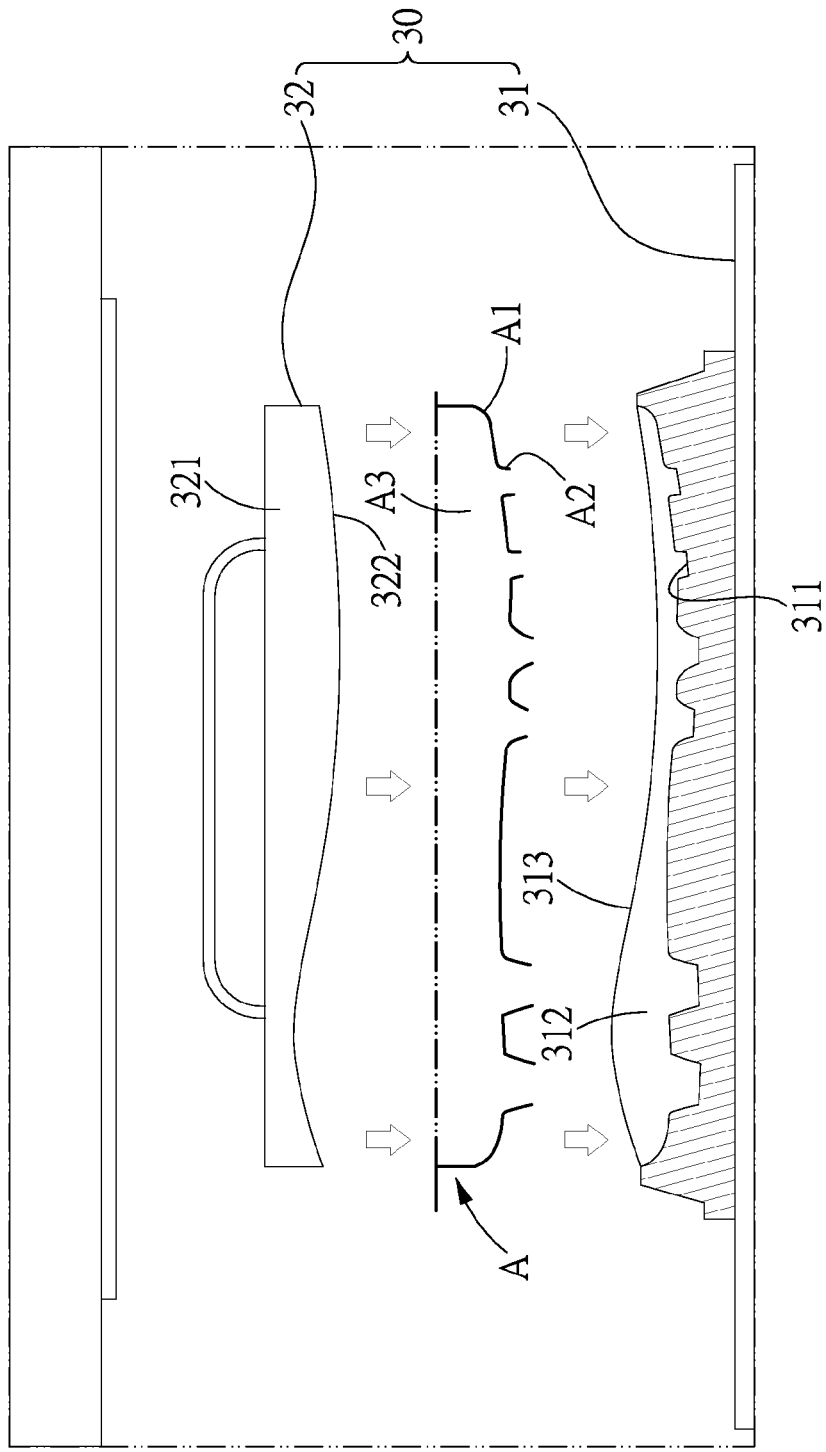
FIG. 10 is an illustrative view showing the step of putting into a trimming mold assembly.
Figure 11:
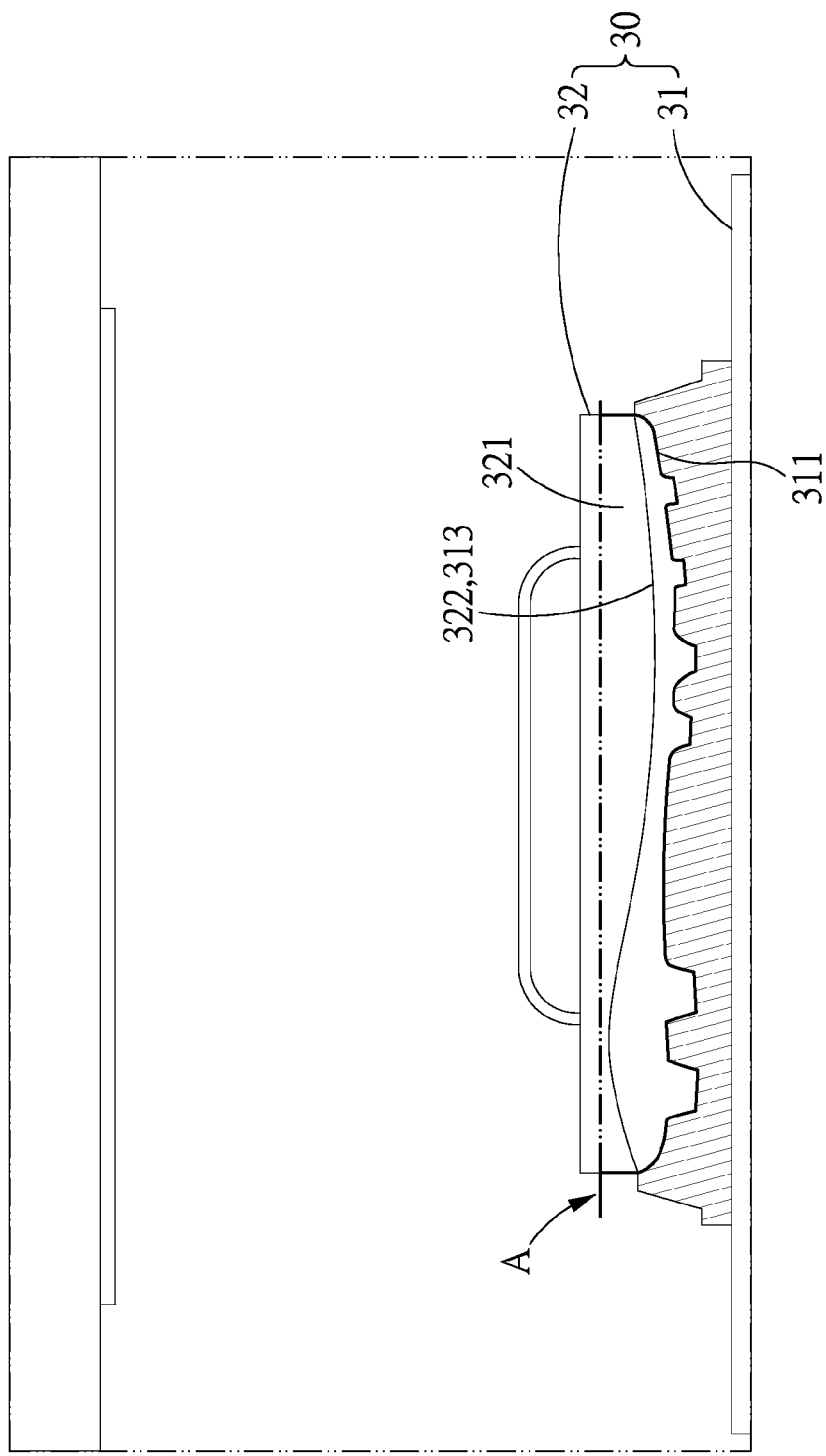
FIG. 11 is an illustrative view showing that the step of putting into a trimming mold assembly has been finished.

The pressing mold 32 includes a support portion 321 with a support edge 322 and is to be placed into the inner surface of the plastic semi product A in a manner that the support edge 322 is aligned to the restricting edge 313 of the carrying mold 31, and the plastic semi product A is clamped between the carrying mold 31 and the pressing mold 32, as shown in FIGS. 10 and 11.

Figure 12:
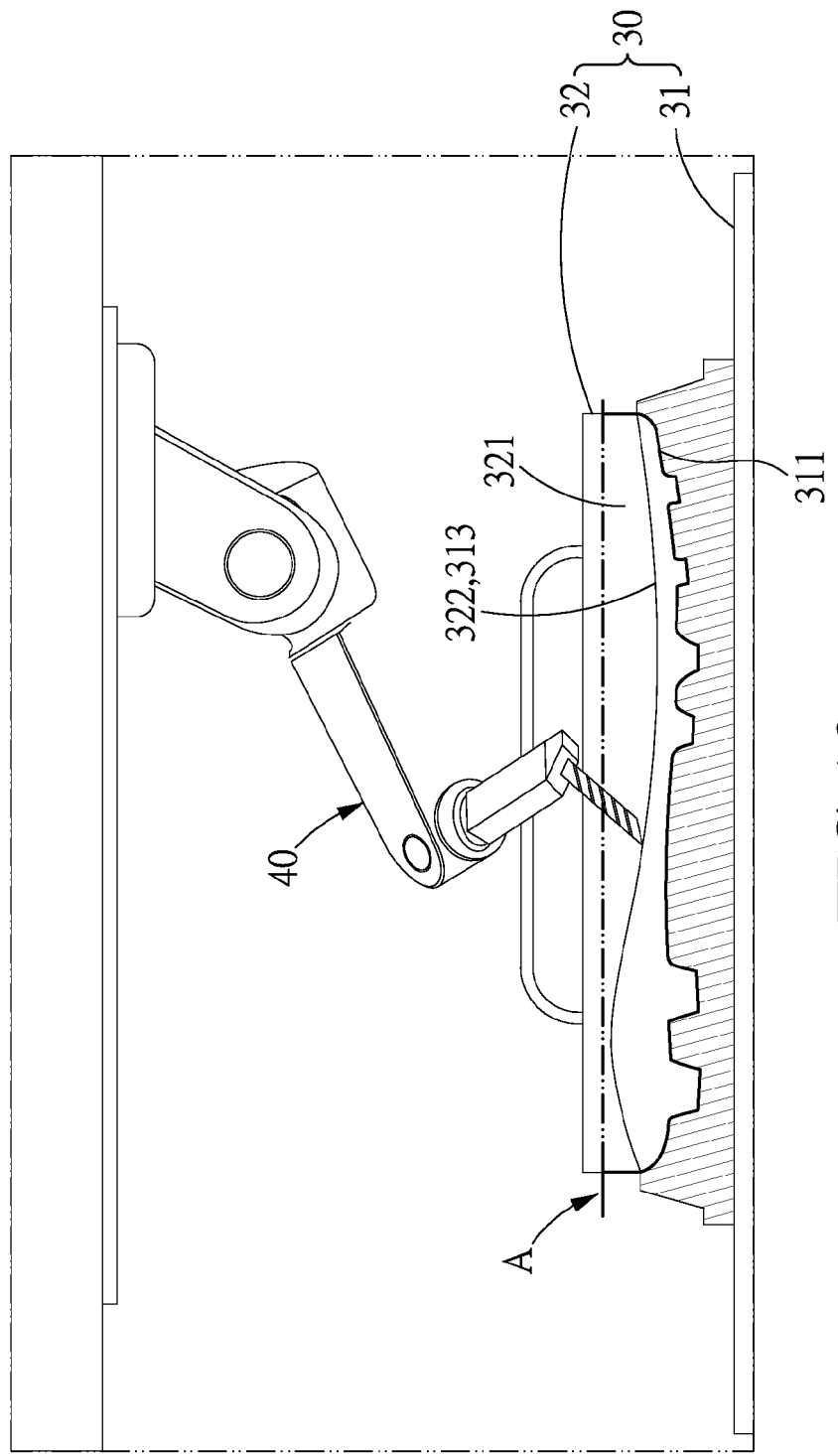
FIG. 12 is an illustrative view showing the step of trimming with a mechanical arm.
Figure 13:
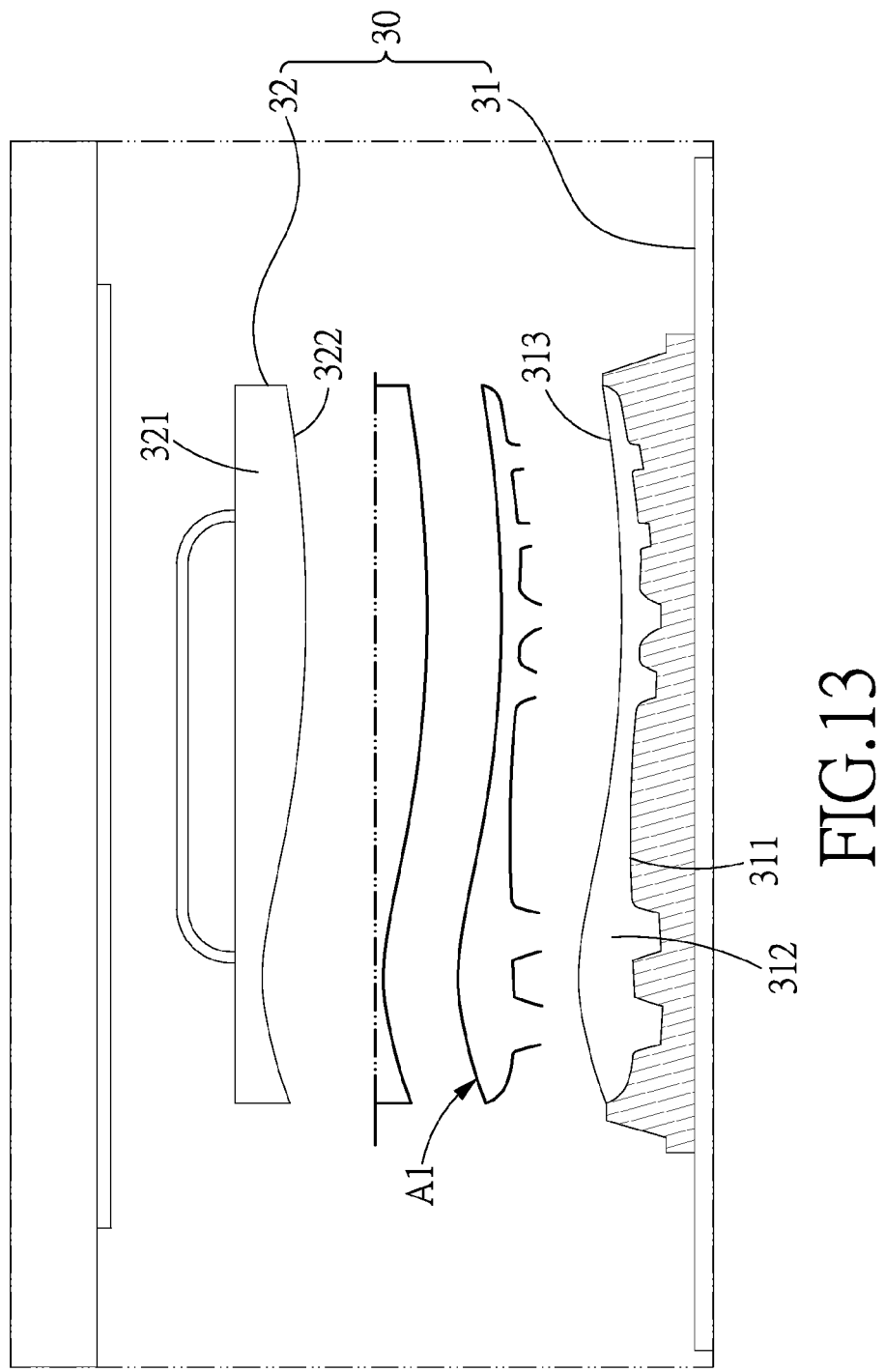
FIG. 13 is an illustrative view showing that the step of trimming with a mechanical arm is finished.

A step VII of trimming with a mechanical arm: using a mechanical arm 40 to trim along the support edge 322 and the restricting edge 313, and obtaining a final product of a plastic support shell of a sole A', as shown in FIGS. 12 and 13.

It can be seen from the above method that the sheet material a or the plastic semi product A can be stably positioned by mold assembly during the steps III, V and VII, so that the above steps can be carried out stably, so as to improve stability of manufacturing the plastic support shell of a sole, and making the manufacturing process more easier.

It is to be noted that, the hole alignment portions 142 of the mold insert 14 allows the plastic semi product A to be formed with the cutting edge A21, the cutting insert 211 is formed in the shape of the chamber A3 of the plastic semi product A, and the edge of the cutting cavity 221 is only able to come into contact with the cutting edge A21 of the plastic semi product A. With all these arrangements, holes can be directly formed and the waste edge A4 can be directly cut off when the cutting mold assembly 20 is closed, which makes the manufacturing process very easy.

Furthermore, the plastic semi product A is a thin shell structure, so that the follow-up steps cannot be performed if the plastic semi product A is not held tight. The present invention uses the carrying mold 31 and the pressing mold 32 to press against the inner and outer surfaces of the plastic semi product A, and uses the restricting edge 313 and the support edge 322 to define the cutting line. Therefore, the plastic semi product A can be firmly positioned and held tight, and then the mechanical arm 40 can trim the plastic semi product A under the guiding of the restricting edge 313 and the support edge 322, which makes the trimming process easy and precise.

While we have shown and described various embodiments in accordance with the present invention, it is clear to those skilled in the art that further embodiments may be made without departing from the scope of the present invention.

What is claimed is:

1. A method for forming a plastic support shell of a sole comprising the following steps:

placing a sheet material into a first mold assembly;

softening the sheet material by heating;

closing and vacuuming the first mold assembly, and cooling the sheet material down to obtain a plastic semi product which is shaped in the contour of the mold insert, the plastic semi product is a shell which has a protruding main portion and a plurality of hole alignment portions formed on an outer surface and a chamber formed on an inner surface, each of the hole alignment portions including a cutting edge which has a cutting angle less than 45 degrees, and the plastic semi product including a waste edge;

putting the plastic semi product into a cutting mold assembly which includes a stationary mold and a movable cutting mold, the stationary mold including a cutting insert which is formed in the shape of the chamber of the plastic semi product, to allow the plastic semi product to fully fit onto the cutting insert, the movable cutting mold including a cutting cavity which has a dimension larger than a dimension of the cutting insert;

moving the movable cutting mold toward the stationary mold, the edge of the cutting cavity is only able to come into contact with the cutting edge of the plastic semi product, so that when the movable cutting mold is pressed against the stationary mold to clamp the waste edge of the plastic semi product, the edge of the cutting cavity will cut the plastic semi product by cutting along the cutting edge, and the movable cutting mold will cut off the waste edge, as a result, the waste edge is cut off, and the cutting edge is also cut off to form holes;

putting the plastic semi product which has been treated by the previous step into a trimming mold assembly which includes a carrying mold and a pressing mold, the carrying mold including a carrying cavity which is formed in the shape of the plastic semi product so as to allow the plastic semi product to fully fit in the carrying cavity, the carrying mold further including a restricting wall which is located adjacent to the carrying cavity, the restricting wall including a restricting edge and is smaller in area than the plastic semi product, so that the peripheral edge of the plastic semi product will protrude out of the restricting wall after the plastic semi product is placed in the carrying cavity, the pressing mold including a support portion with a support edge and to be placed into the inner surface of the plastic semi product in a manner that the support edge is aligned to the restricting edge of the carrying mold, and the plastic semi product is clamped between the carrying mold and the pressing mold; and using a mechanical arm to trim the plastic semi product obtained from the previous steps by trimming along the support edge and the restricting edge, and obtaining a final product of the plastic support shell of a sole.

2. The method for forming the plastic support shell of a sole as claimed in claim 1, wherein the first mold assembly includes a first mold and an opposite second mold, the first mold includes an extendable and retractable seat which is movable with respect to the second mold, on the extendable and retractable seat is provided a mold insert which includes a molding portion and a plurality of hole alignment portions formed on the molding portion, each of the hole alignment portions of the first mold assembly includes a cutting edge which has a cutting angle less than 45 degrees, the sheet material is placed on the first mold of the first mold assembly and located between the mold insert of the first mold and the second mold;

the closing and vacuuming the first mold assembly includes closing the first mold assembly and vacuuming the space between the first and second molds, moving the extendable and retractable seat towards the second mold until the mold insert is pressed against the sheet material, so that the sheet material is pressed onto the mold insert and shaped in the contour of the mold insert.

3. The method for forming the plastic support shell of a sole as claimed in claim 1, wherein the first mold assembly includes a first mold and an opposite second mold, and the softening the sheet material includes providing a heating device between the first and second molds to heat the sheet material.

* * * * *